Dec. 29, 1964 T. J. TULP ETAL 3,163,774

TRANSISTOR CIRCUIT FOR PRODUCING CURRENT PULSES THROUGH A VARIABLE IMPEDANCE

Original Filed July 22, 1957

INVENTOR.
THEODORUS J. TULP
HEINE A.R. DE MIRANDA
BY
Frank R. Jifari
AGENT

United States Patent Office 3,163,774
Patented Dec. 29, 1964

3,163,774
TRANSISTOR CIRCUIT FOR PRODUCING CURRENT PULSES THROUGH A VARIABLE IMPEDANCE

Theodorus Joannes Tulp and Heine Andries Rodrigues de Miranda, Eindhoven, Netherlands, assignors to North American Philips Company, Inc., New York, N.Y., a corporation of Delaware Original application July 22, 1957, Ser. No. 673,365, now Patent No. 2,956,174, dated Oct. 11, 1960. Divided and this application Aug. 5, 1960, Ser. No. 60,238
4 Claims. (Cl. 307—88.5)

The present application is a division of U.S. patent application Serial No. 673,365, filed July 22, 1957, now U.S. Patent 2,956,174.

This invention relates to transistor circuits for producing current pulses of substantially constant amplitude through a variable load impedance, for example through a series of ferromagnetic memory elements, control pulses being supplied to the base of the transistor and the load impedance being included in its collector-emitter circuit in series with a source of collector voltage.

In computers and in other similar applications of the pulse technique, it is frequently desirable for current pulses of substantially constant amplitude to be passed through an impedance. The impedance, however, frequently varies with operating conditions. In order to maintain the amplitude of the current pulses substantially constant, the current source must have a comparatively high natural impedance. In such applications use is increasingly made of transistors, since they have important advantages with respect to other pulse sources; they occupy very little space, the required supply voltage is comparatively low and the efficiency of a transistor operating as a switch is much higher than that, for example, of a tube, so that very little energy is unnecessarily converted into heat. On the other hand, very small cores of ferromagnetic material having a substantially rectangular hysteresis loop are increasingly being used as memory elements, more particularly in computers and other analogous apparatus. The combination of small ferromagnetic cores as memory elements and of transistors as reading-out and/or control elements is very attractive. However it is usually necessary for a whole series of memory elements to be controllable by means of the same source of pulses. According to whether a memory core was or was not magnetized in the reverse direction prior to control, it does or does not produce a counter-electromotive force during control, so that the effective load impedance connected to a source of current pulses controlling a series of such cores varies in accordance with the magnetic state of these cores. If, for example, all of the cores are premagnetized in the reverse direction the value of the load impedance is maximum, whilst it is much smaller if only one or two cores of a series of, for example, 40 cores are premagnetized in said reverse direction.

Figure 1:
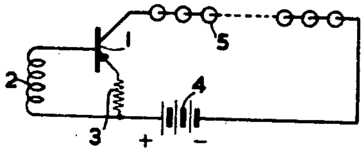

A very simple transistor circuit for controlling a series of ferromagnetic memory elements is shown in FIG. 1 of the accompanying drawing. The series of ferromagnetic memory elements 5 is included in the collector-emitter circuit of a transistor 1, control pulses being supplied by means of the secondary winding 2 of an input transformer to the base of transistor 1. A direct-current source 4, for example a battery, is connected in series with the memory elements in the collector-emitter circuit, the emitter of transistor 1 being connected via a resistor 3 to one terminal of this voltage source, so that the current produced by the control pulses in the base-emitter circuit of transistor 1 is limited by this resistor.

Figure 2:
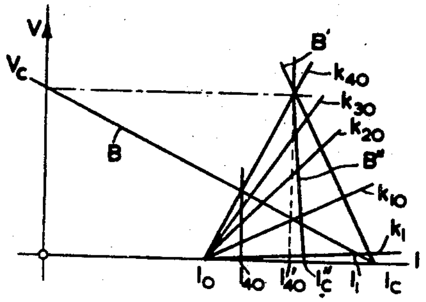

To control any arbitrary core of the series of memory elements 5 used in the circuit shown in FIG. 1, a minimum current $I_0$ is required (see FIG. 2). Assuming that the transistor 1 can pass twice as large a current $I_0$ and that the current passed is to be prevented from unduly varying in accordance with the magnetic state of the cores and thus approaching the minimum value $I_0$, the value for the total resistance in the circuit of the current source 4 must be chosen to be comparatively high. The voltage of this current source then becomes correspondingly high and readily exceeds the maximum collector-emitter voltage permissible for the transistor. In this case, it is assumed that the transistor 1 operates below the curvature of its $I_0$–$V_c$ characteristic, so that its dissipative power may remain comparatively small. These operating conditions are shown in the diagram of FIG. 2, in which lines $k_1$, $k_{10}$, $k_{20}$, $k_{30}$ and $k_{40}$ are drawn in accordance with the counter-electromotive force produced by one core and by a group of, for example, 10, 20, 30, 40 cores respectively for a given amplitude of the current pulse, whilst line B represents a load characteristic corresponding to the maximum values permissible for the collector current and the collector voltage.

If a magnetization inverting current pulse having an intensity I greater than $I_0$ is supplied to a winding of a premagnetized magnetic core having a rectangular hysteresis loop, so that the number of ampere turns required for changing-over the magnetization of the core is reached or exceeded, the magnetization of the core changes-over at a speed which increases in proportion to $I-I_0$. A reading pulse produced due to change-over of the magnetization of the core has a corresponding length T. The core is characterized inter alia by a given $\Delta\phi$ max., that is to say by the total variation in flux between the two opposite states of saturation, and it has been found that the integral of the instantaneous value V of the amplitude of the reading pulse is constant over the pulse length T and proportional to $\Delta\phi$ max. If the value of $I-I_0$ is comparatively small, the magnetization of the core changes over only very slowly, producing a weak read-out pulse of small amplitude. When using such cores, it is therefore necessary to utilize control pulses of an intensity such that $I-I_0$ does not fall below a given minimum value. Furthermore, when controlling by means of a transistor, the value of I is limited by the maximum permissible collector current $I_c$. From this it is apparent that it is necessary for the spread $\Delta I$ of the pulse currents to be limited to a minimum value. With the load characteristic B, $I_1$ (by change-over of the magnetization in only one memory element) is approximately equal to $$I_c-\frac{I_c-I_0}{10}$$

whereas $I_{40}$ (by change-over of the magnetization in 40 elements) is approximately equal to $$I_c-\frac{8(I_c-I_0)}{10}$$

The spread $\Delta I$ is thus considerable and approximately 70% of $I_c-I_0$.

By increasing the voltage of the pulse source and of the resistor connected in series with the memory elements, a load characteristic B′ (FIG. 2) would be obtained, if the value of the maximum current $I_c$ remains constant. The spread $I_1'$–$I_{40}'$ is thus reduced to about 45% of $I_c-I_0$, the collector voltage during the pulses being at most equal to $V_c$. FIG. 2 shows a third load characteristic B′, which for $V=0$, passes through a point corresponding to a current $I_c''$ smaller than $I_c$, the maximum permissible collector voltage not being exceeded during the pulses.

Along this characteristic the spread $\Delta I$ is less than 10% of $I_c-I_0$ or less than 20% of $I_c''-I_0$. However, there arises the difficulty that, with the load characteristic B′ or B″, the voltage required to pass a current greater than, or equal to $I_{40}'$ through the resistance of the whole load circuit of the current source is several times higher than the maximum collector voltage $V_c$ permissible for the transistor.

The object of the invention is to overcome said difficulty. The transistor circuit according to the invention is characterized in that a controllable impedance comprising an inductance is connected in series with the load impedance, said inductance being coupled to such a control circuit that the impedance exhibits a comparatively low value below a predetermined collector-current and a comparatively high value above said predetermined collector-current.

Figure 3:
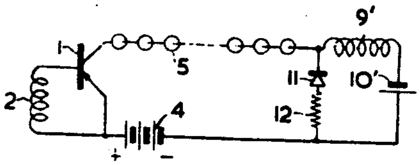
Figure 4:
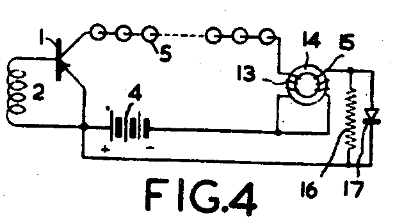

In order that the invention may be readily carried into effect, several embodiments will now be described more fully, by way of example, with reference to the accompanying drawings, in which:

FIGS. 3 and 4 show the diagrams of two different embodiments.

The embodiment shown in FIG. 3 is very similar to the circuit shown in FIG. 1. However, it comprises a controllable impedance constituted by an inductance 9′ for example of 300 μh., in series with a second voltage source 10′, of comparatively low voltage, a rectifier 11, and a resistor 12. The voltage source 10′ in series with the inductance 9′ is included in the reverse direction in the collector path of transistor 1, the rectifier 11 in series with the resistor 12 being connected in parallel with the series-combination of the inductance 9′ and the source 10′ in the forward direction with respect to this voltage source.

In the rest condition, a current flows from the source 10′ through the inductance 9′, the rectifier 11 and the resistor 12. The resistor 12 limits this current to the desired value which is related to the peak value of the current pulses which can be passed through the load impedance 5. The transistor 1 is cut off and the voltage applied between its emitter and base and its collector is substantially equal to that of the direct-current source 4 plus that of the source 10′. When a current pulse is supplied to the input winding 2, the emitter-collector path of the transistor 1 is suddenly opened, resulting in a strong decrease of the voltage across rectifier 11, so that this rectifier is cut off. The current which flowed through the rectifier now passes through the load impedance 5 and the transistor 1 and, since this current cannot rapidly change in value due to the effect of the inductance 9′, the initial value of the current pulse through the load impedance 5 is substantially equal to the value of the current which flows through the inductance 9′, the rectifier 11 and the resistor 12 when the circuit is in the rest condition. The amplitude of the current pulse through the load impedance 5 is thus substantially independent of the value of this impedance, for example of the number of memory cores premagnetized in the reverse direction. After each control pulse, the no-load current through the inductance 9′ has to adjust itself again to its no-load value. If the time interval between two sequential control pulses is too small, the no-load current has not increased to its adjusted value at the moment when the second control pulse again opens the transistor 1. Consequently, the initial value of the second current pulse through the load impedance 5 is less than normal. To avoid this, the time constant $L/R_g$ of the circuit via the inductance 9′, the rectifier 11, the resistor 12 and the voltage source 10′ must be chosen at least several times smaller than the minimum time interval between two sequential control pulses. The adjusted value of the current through the above-mentioned circuit is then substantially independent of this time interval. To attain the object aimed at and to cut off the rectifier 11 during the pulses, the voltages of the sources 4 and 10′, the minimum value of the total resistance $R_{tr}$ of the emitter-collector circuit of transistor 1 in the conductive state and the natural resistance of the inductance 9′ are chosen to be such that the current through the load impedance 5 increases after reaching an initial value substantially equal to the adjusted value of the current through the inductance 9′. However, up to the end of the control pulse, this increase must be limited to, for example, −10%, since otherwise a spread in the form of the read-out pulses would result. Consequently, the time-constant $L/R_{tr}$ is preferably several times greater than the length of the control pulses.

The transistor of the circuit shown in FIG. 3 actually operates as a switch which changes-over the current through the inductance 9′ during the current pulses across the load impedance, the rectifier 11 then being cut-off due to the fact that the potential at the common point of the rectifier 11 and the inductance 9′ becoming less than that at the common point of the voltage sources 4 and 10′.

In the second embodiment shown in FIG. 4, the controllable impedance is constituted by an inductance 13 which is connected in series with the load impedance 5. This inductance is arranged on a ferromagnetic core 14, which is pre-magnetized in a manner such that the inductance is saturated and has a low impedance. This pre-magnetization is brought about by means of a second winding 15 arranged on the core 14 and connected to a direct-current source. In FIG. 4, the supply voltage source 4 for the emitter-collector circuit of transistor 1 is also used for the premagnetization of core 14. The winding 15 is connected to the common point of the source 4 and of the load circuit 5, 13 and also to the emitter of the transistor 1 via a resistor 16. If a control pulse is supplied to the input winding 2, a current pulse flows through the load impedance 5 and the winding 13. The respective directions of the windings 13 and 15 are chosen to be such that this current pulse suppresses at least partially the pre-magnetization of core 14. This results in the impedance of winding 13 being greatly increased, so that the amplitude of the current pulses through this winding and through the load impedance 5 is limited by the impedance of this winding and is substantially independent of the value of the load impedance. The ratio between the number of turns $n_1$ of the winding 13 and the number of turns $n_2$ of the winding 15, the voltage of the pre-magnetization current source and the value of resistor 16 are chosen to be such that the current through the winding 15 saturates the core 14 when the transistor is cut off, but is less than $$\frac{n_1}{n_2}a'.i$$

wherein $a'$ is the base-collector current amplification factor of the transistor 1 and $i$ is the current produced by the current pulse in the base-emitter circuit of this transistor.

At the end of each current pulse through the load impedance 5 and the winding 13, a current pulse counteracting the pre-magnetization current is induced through the winding 15. If this current flows through resistor 16, it is limited by it and the energy accumulated in the inductance 13 and its core 14 is partly dissipated in resistor 16 and also produces at the terminals of the winding 13, a counter voltage surge which may exceed the permissible collector voltage. In order to suppress this counter-voltage surge, a rectifier 17 is connected in parallel with resistor 16 and connected in the cut-off direction with respect to the voltage source 4, so that the pre-magnetization current is determined by the resistor 16. However, the rectifier 17 is conducting with respect to the current pulse induced through the winding 15 at the end of each current pulse so that said current pulse is fed back to the voltage source 4 via rectifier 17. If this voltage source is, for example a battery, it is recharged by the current pulse thus fed back, so that very little energy is unnecessarily dissipated in the windings 13, 15 and in the core 14.

What is claimed is:

1. A transistor circuit for producing current pulses of substantially constant amplitude through a variable load impedance, comprising a transistor having base, emitter and collector electrodes, means for applying control pulses to said base electrode, a source of collector voltage, a variable load impedance connected in the collector-emitter circuit of the transistor in series with said source of collector voltage, a controllable impedance comprising an inductance connected in series with said load impedance, said inductance being coupled to a control circuit comprising a rectifier shunting said inductance and at least a portion of said collector voltage source, the polarity of said rectifier being in the forward direction with respect to said portion of the voltage source, whereby a current flows through said rectifier and said inductance when the transistor is nonconducting, the amplitude of said current being substantially equal to the desired constant value of the amplitude of the current pulses.

2. A circuit as claimed in claim 1, wherein the time constant of the circuit constituted by said inductance and said rectifier is substantially smaller than the minimum time interval between two successive control pulses, whereby the amplitude of the current through said circuit is substantially independent of said time interval.

3. A circuit as claimed in claim 1, wherein the time constant of the circuit constituted by said inductance, said load impedance and the collector-emitter path of said transistor in the conducting state is substantially greater than the length of the applied control pulses.

4. A circuit as claimed in claim 2, wherein the time constant of the circuit constituted by said inductance, said load impedance and the collector-emitter path of said transistor in the conducting state is substantially greater than the length of the applied control pulses.

References Cited in the file of this patent

UNITED STATES PATENTS

| | | |
|---|---|---|
| 2,972,061 | Mueller | Feb. 14, 1961 |
| 2,994,003 | Einsele et al. | July 25, 1961 |